US012680991B2

(12) United States Patent
Kanazawa

(10) Patent No.: US 12,680,991 B2
(45) Date of Patent: Jul. 14, 2026

(54) WAVEFORM-ANALYZING METHOD, WAVEFORM-ANALYZING DEVICE AND ANALYZING SYSTEM

(71) Applicant: SHIMADZU CORPORATION, Kyoto (JP)

(72) Inventor: Shinji Kanazawa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 313 days.

(21) Appl. No.: 18/633,692

(22) Filed: Apr. 12, 2024

(65) Prior Publication Data

US 2024/0345047 A1    Oct. 17, 2024

(30) Foreign Application Priority Data

Apr. 14, 2023    (JP) ................................. 2023-066403

(51) Int. Cl.
*G01N 30/86*          (2006.01)
*G01N 30/72*          (2006.01)
(52) U.S. Cl.
CPC ......... *G01N 30/8675* (2013.01); *G01N 30/72* (2013.01); *G01N 30/8631* (2013.01)
(58) Field of Classification Search
None
See application file for complete search history.

(56) References Cited

U.S. PATENT DOCUMENTS 12,474,309 B2 *   11/2025   Kanazawa ............. G01N 27/62
2022/0373522 A1   11/2022   Kanazawa

FOREIGN PATENT DOCUMENTS

WO      WO-2021064924 A1 *   4/2021   ......... G01N 30/8682

OTHER PUBLICATIONS

"Peakintelligence™, Peak Processing Optional Software for LabSolutions Insight™", [online], [accessed on Mar. 16, 2023], Shimadzu Corporation, the Internet < URL : https://www.an.shimadzu.co.jp/products/liquidchromatograph-mass-spectrometry/lc-mssoftware/peakintelligence/index.html > ; with English translation.
Ronneberger, et al.; "U-Net: Convolutional Networks for Biomedical Image Segmentation", [online], [submitted on May 18, 2015], arXiv.org, the Internet < URL: https://arxiv.org/pdf/1505.04597.pdf > .

* cited by examiner

*Primary Examiner* — Andrew Smyth
(74) *Attorney, Agent, or Firm* — Renner, Otto, Boisselle & Sklar, LLP

(57)          ABSTRACT

Provided is a method for analyzing a signal waveform which is a chromatogram or spectrum, including: a model creation step for creating a trained model for locating a peak portion in an input waveform, by machine learning using a plurality of sets of reference waveforms in each of which the position of the peak portion is known; a region estimation step (S11-S14) for dividing an analysis-target waveform into partial waveforms, for determining whether or not each of the partial waveforms is a peak portion by using the trained model, and for estimating different kinds of regions including a peak region and a non-peak region in the analysis-target waveform, based on the determination result; and a detection step (S15) for detecting an incorrect region estimation result by determining whether or not the sequence of the estimated regions along the horizontal axis of the analysis-target waveform conforms to a predetermined regulation.

24 Claims, 8 Drawing Sheets

Fig. 3

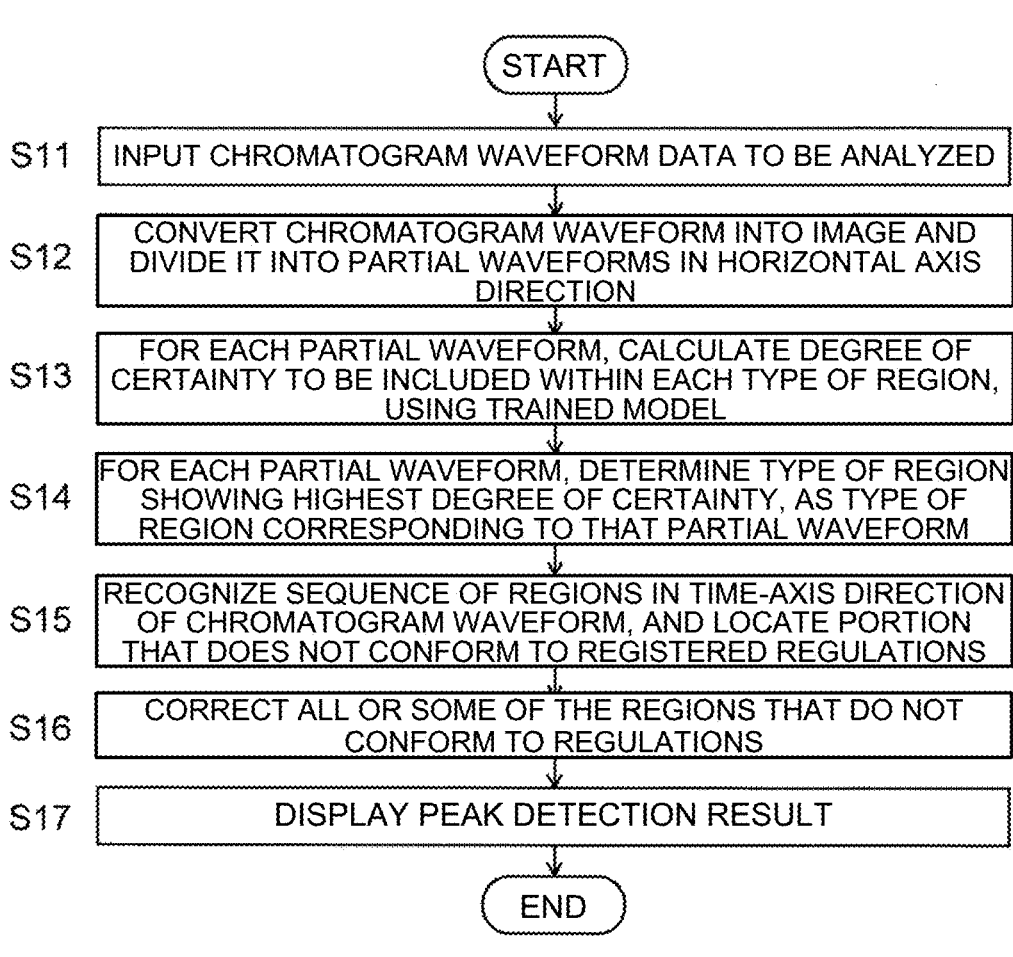

START

S11   INPUT CHROMATOGRAM WAVEFORM DATA TO BE ANALYZED

S12   CONVERT CHROMATOGRAM WAVEFORM INTO IMAGE AND DIVIDE IT INTO PARTIAL WAVEFORMS IN HORIZONTAL AXIS DIRECTION

S13   FOR EACH PARTIAL WAVEFORM, CALCULATE DEGREE OF CERTAINTY TO BE INCLUDED WITHIN EACH TYPE OF REGION, USING TRAINED MODEL

S14   FOR EACH PARTIAL WAVEFORM, DETERMINE TYPE OF REGION SHOWING HIGHEST DEGREE OF CERTAINTY, AS TYPE OF REGION CORRESPONDING TO THAT PARTIAL WAVEFORM

S15   RECOGNIZE SEQUENCE OF REGIONS IN TIME-AXIS DIRECTION OF CHROMATOGRAM WAVEFORM, AND LOCATE PORTION THAT DOES NOT CONFORM TO REGISTERED REGULATIONS

S16   CORRECT ALL OR SOME OF THE REGIONS THAT DO NOT CONFORM TO REGULATIONS

S17   DISPLAY PEAK DETECTION RESULT

END

WAVEFORM-ANALYZING METHOD, WAVEFORM-ANALYZING DEVICE AND ANALYZING SYSTEM

TECHNICAL FIELD

The present invention relates to a method and device for analyzing a signal waveform acquired with an analyzing system, as well as an analyzing system including that type of waveform-analyzing device.

BACKGROUND ART

In a chromatogram acquired with a gas chromatograph (GC), liquid chromatograph (LC) or similar analyzing device, a peak originating from a component in a sample appears. A data-processing device provided for those types of analyzing devices is normally configured to detect peaks by performing a waveform-processing operation on a chromatogram acquired through an analysis, and to identify a peak corresponding to the target compound by performing an identifying operation on each of the detected peaks. The concentration or content of the compound corresponding to an identified peak is calculated from the area or height of that peak.

To date, various methods have been practically used as methods for detecting peaks. In recent years, methods which employ machine learning have been proposed and put into practical use as a new type of peak detection method (see Patent Literature 1 and Non Patent Literature 1).

In a waveform-analyzing method described in Patent Literature 1, each reference waveform with the position of the peak portion already known is divided into segments along the time axis to prepare a set of partial waveforms for each of the reference waveforms, and machine learning is performed using a large number of sets of partial waveforms prepared for the reference waveforms to create a trained model for identifying a partial waveform corresponding to a peak portion in an input waveform. Similar to the reference waveforms, an analysis-target waveform is also divided into a plurality of partial waveforms, and the trained model is applied to each of those partial waveforms to determine whether the partial waveform corresponds to a peak portion. Based on the determination result, the peak regions and other regions in the entire analysis-target waveform are determined. Machine learning can also be performed using a partial waveform corresponding to a peak-beginning or peak-ending point, other than the peak portion, to create a model with which a partial waveform corresponding to a peak-beginning or peak-ending point can be found among a plurality of partial waveforms in an analysis-target waveform. Additionally, the peak portions can be further divided into single peak portions and unseparated peak portions in which a plurality of peaks overlap each other, so as to determine single-peak regions and unseparated-peak regions in the analysis-target waveform.

CITATION LIST

Patent Literature

Patent Literature 1: WO 2021/064924 A

Non Patent Literature

Non Patent Literature 1: "Peakintelligence™, Peak Processing Optional Software for LabSolutions Insight™", [online], [accessed on Mar. 16, 2023], Shimadzu Corporation, the Internet Non Patent Literature 2: Olaf Ronneberger and two other authors, "U-Net: Convolutional Networks for Biomedical Image Segmentation", [online], [submitted on 18 May 2015], arXiv.org, the Internet

SUMMARY OF INVENTION

Technical Problem

The peak detection which employs machine learning is an extremely useful method in that it can eliminate or reduce the time and labor for the cumbersome parameter-setting task by the user. Furthermore, in many cases, this technique can detect peaks with a considerable level of accuracy for various chromatogram waveforms. However, depending on the shape of the analysis-target waveform or other factors, the determination on the peak region or other kinds of regions may be incorrectly performed and possibly produces an unreasonable, inappropriate peak detection result which contradicts common technical knowledge.

The objective of the present invention is to provide a waveform-analyzing method and a waveform-analyzing device by which, even when the peak detection has not been appropriately performed by a peak detection process which employs machine learning, the inappropriate peak portion can be automatically recognized by a waveform-processing operation performed after the peak detection process, and the inappropriate portion can be shown to the user or be automatically corrected without manual intervention.

Solution to Problem

One mode of the waveform-analyzing method according to the present invention is a waveform-analyzing method for analyzing a signal waveform which is a chromatogram or a spectrum with intensity on a vertical axis and time, wavelength, or mass to charge ratio on a horizontal axis, the method including:

a model creation step for creating a trained model for locating a peak portion in an input waveform, by machine learning using a plurality of sets of reference waveforms in each of which the position of the peak portion is known;

a region estimation step for dividing an analysis-target waveform into a plurality of partial waveforms on the horizontal axis, for determining whether or not each of the plurality of partial waveforms is a peak portion by using the trained model, and for estimating a plurality of different kinds of regions including a peak region and a non-peak region in the analysis-target waveform, based on the result of the determination; and a detection step for detecting an incorrect region estimation result by determining whether or not the sequence of the regions estimated in the region estimation step along the horizontal axis of the analysis-target waveform conforms to a predetermined regulation.

One mode of the waveform-analyzing device according to the present invention is a waveform-analyzing device configured to analyze a signal waveform which is a chromatogram or a spectrum with intensity on a vertical axis and time, wavelength, or mass to charge ratio on a horizontal axis, the device including:

a region estimator configured to divide an analysis-target waveform into a plurality of partial waveforms on the horizontal axis, to determine whether or not each of the plurality of partial waveforms of the analysis-target waveform is a peak portion, by using a trained model created by machine learning using a plurality of reference waveforms in each of which the position of the peak portion is known, and to estimate a plurality of different kinds of regions including a peak region and a non-peak region in the analysis-target waveform, based on the result of the determination; and a detector configured to detect an incorrect region estimation result by determining whether or not the sequence of the regions estimated in the region estimator along the horizontal axis of the analysis-target waveform conforms to a predetermined regulation.

Furthermore, one mode of the analyzing system according to the present invention is a chromatograph system, a mass spectrometer or an optical measurement device and includes any one mode of the waveform-analyzing device according to the present invention as a data analyzer.

Advantageous Effects of Invention

By the previously described modes of the waveform-analyzing method and the waveform-analyzing device according to the present invention, even when the peak detection has not been appropriately performed by a peak detection process which employs machine learning, the incorrect peak portion can be automatically recognized by a waveform-processing operation performed after the peak detection process, and the incorrect portion can be shown to the user or be automatically corrected without manual intervention. Thus, the peak detection can be automatized by using machine learning, while eliminating or decreasing an output of an unreasonable, incorrect peak detection result that cannot be yielded by peak detection based on human judgment.

BRIEF DESCRIPTION OF DRAWINGS

FIG. 3 is a flowchart showing the procedure of a peak detection process on a chromatogram waveform to be analyzed in the analyzing system according to the present embodiment.

DESCRIPTION OF EMBODIMENTS

In the previously described modes of the waveform-analyzing method and the waveform-analyzing device according to the present invention, the chromatogram includes a chromatogram acquired with a GC system including a gas chromatograph mass spectrometer (GC-MS) and a chromatogram acquired with an LC system including a liquid chromatograph mass spectrometer (LC-MS), as well as an electropherogram acquired with an electrophoresis apparatus. In the case of a GC or LC system using a mass spectrometer as a detector, the chromatogram includes a total ion (total ion current) chromatogram and an extracted ion chromatogram. The spectrum includes a mass spectrum acquired with a mass spectrometer (a profile spectrum without centroid processing), a time-of-flight spectrum acquired with a time-of-flight mass spectrometer and not yet converted into a mass spectrum, an optical intensity spectrum acquired with an optical measurement apparatus, such as a spectrophotometer or fluorometer, as well as an X-ray intensity spectrum acquired with an X-ray analyzer.

Hereinafter, an LC system is described, with reference to the attached drawings, as one embodiment of an analyzing system including a waveform-analyzing device in which a waveform-analyzing method according to the present invention is carried out.

Figure 1:
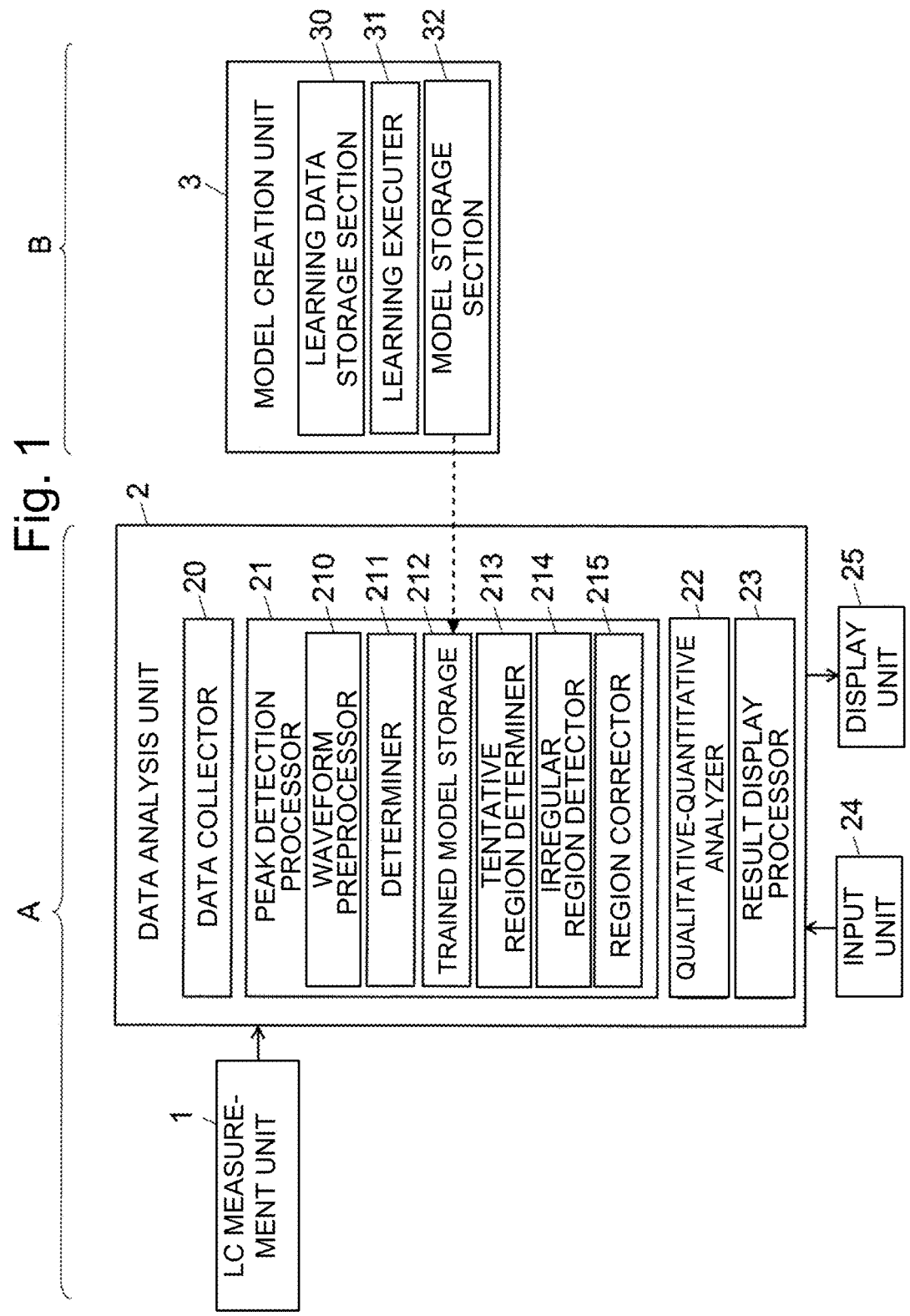
FIG. 1 is a schematic configuration diagram of one embodiment of an analyzing system for carrying out a waveform-analyzing method according to the present invention.

FIG. 1 is a schematic configuration diagram of an LC system A according to the present embodiment as well as a system B which creates a trained model to be used in the LC system A.

The LC system A in the present embodiment includes an LC measurement unit 1, data analysis unit 2, input unit 24 and display unit 25. Though not shown, the LC measurement unit 1 includes a liquid-supply pump, injector, column, column oven, detector and other components, to perform an LC analysis on a given sample and acquire chromatogram data which show a temporal change in the intensity of a signal obtained with the detector. There is no specific limitation on the type of detector and the detection method; for example, a mass spectrometer or photodiode array (PDA) detector can be used.

The data analysis unit 2 includes a data collector 20, peak detection processor 21, qualitative-quantitative analyzer 22, display processor 23 and other functional blocks. The peak detection processor 21 includes a waveform preprocessor 210, determiner 211, trained model storage section 212, tentative region determiner 213, irregular region detector 214, region corrector 215 and other functional blocks.

In the data analysis unit 2, the data collector 20 accumulates chromatogram data acquired in the LC measurement unit 1 and stores those data in a memory unit. According to an instruction received from a user through the input unit 24, the peak detection processor 21 automatically detects peaks in a chromatogram waveform constructed from the accumulated chromatogram data and produces peak information of each detected peak including the beginning and ending positions (retention time), range of the peak region and other pieces of information. Based on the peak information given from the peak detection processor 21, the qualitative-quantitative analyzer 22 identifies a component (compound) corresponding to each peak, as well as calculates a peak-height value or peak-area value and computes a quantitative value as the concentration or content of each component from that peak-height or peak-area value. The display processor 23 shows the peak detection result as well as the quantitative value and other related values calculated from the peak detection result, in a predetermined form on the display unit 25.

In common cases, the data analysis unit 2 is actually a personal computer or more sophisticated workstation on which predetermined software (computer program) is installed, or a computer system including a high-performance computer connected to the previously mentioned types of computers via a data communication network. In other words, the function of each block included in the data analysis unit 2 is embodied by a stand-alone computer or on a computer system including a plurality of computers by executing specific software installed on the computer or computers. Needless to say, some of those functions may be implemented by using a hardware circuit dedicated to specific types of mathematical operations, such as a digital signal processor.

The computer program can be offered to users in the form of a non-transitory computer-readable record medium holding the program, such as a CD-ROM, DVD-ROM, memory card, or USB memory (dongle). The program may also be offered to users in the form of data transferred through the Internet or similar communication networks. The program can also be preinstalled on a computer (or more exactly, on a storage device as a component of a computer) as a part of a system before a user purchases the system.

In FIG. 1, the system B, which is provided apart from the LC system A, includes a model creation unit 3. The model creation unit 3 includes a learning data storage section 30, learning executer 31 and model storage section 32 as its functional blocks. The trained model created in this model creation unit 3 is stored in the trained model storage section 212 in the data analysis unit 2 of the LC system A.

As will be detailed later, the task of creating a trained model normally requires a huge amount of calculation. Therefore, the system B is actually a high-performance computer, with the function of each block embodied by executing, on that computer, a piece of software installed on the same computer. Needless to say, the system B may be unified with the LC system A.

Next, the peak detection process to be performed by the peak detection processor 21 and other related sections in the data analysis unit 2 is described.

An extremely simple description of the operations in the peak detection processor 21 is as follows: A chromatogram waveform constructed from chromatogram data is converted into an image. The technique of semantic segmentation based on deep learning, which is a technique of machine learning for determining the category and position of an object present on an image, is applied to the image to detect the position or range of a peak region, peak-beginning region, peak-ending region, non-peak region or other kinds of regions.

[Creation of Trained Model]

Figure 2:
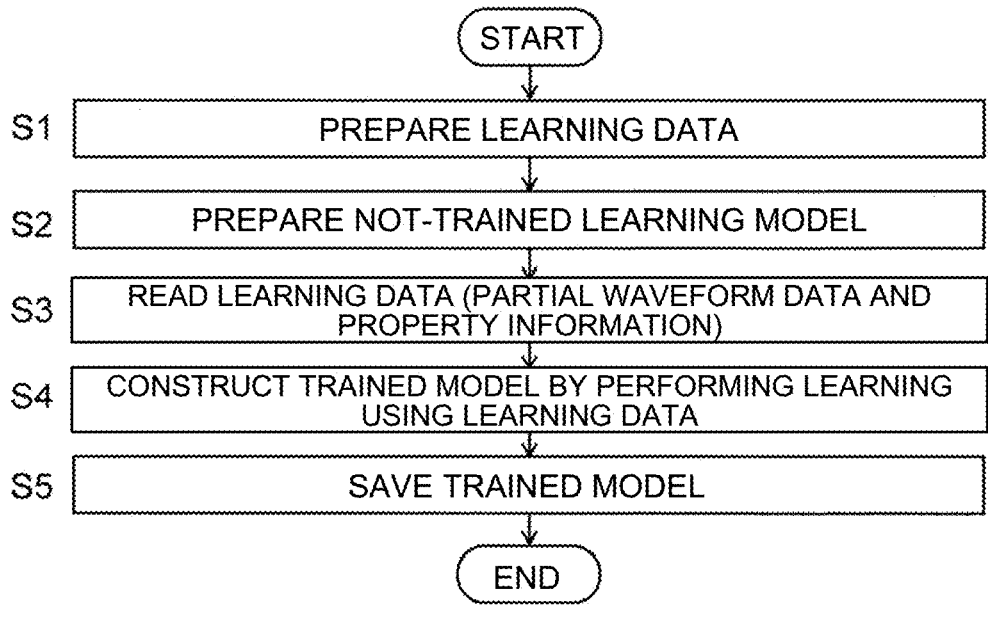
FIG. 2 is a flowchart showing the procedure of a trained model creation process in the analyzing system according to the present embodiment.

As is commonly known, machine learning methods require previously constructing a trained model using a large amount of learning data (training data and verification data). As noted earlier, the task of creating the trained model is not performed in the data analysis unit 2, which is a portion of the LC system A, but in the model creation unit 3 consisting of another computer system, and the resultant model is stored in the model storage section 212. FIG. 2 is a flowchart schematically showing the procedure of the trained model creation process performed in the model creation unit 3.

For the creation of a trained model, learning data based on reference waveforms are initially prepared (Step S1). A huge number and wide variety of chromatograms waveforms are used as the reference waveforms in this step. The "wide variety of chromatogram waveforms" in the present context should preferably be chromatogram waveforms including the mixture of various types of noise, fluctuation (drift) of the base line, overlap of multiple peaks, deformation of the peak shape and other elements which may possibly occur in a chromatogram waveform in the actual process of peak detection. It should be noted that the chromatogram waveform data do not need to be data collected through actual LC analyses; they may also be data created through simulations.

For each chromatogram waveform used as a reference waveform, a peak detection process is performed beforehand, whereby the accurate beginning and ending points are determined for one or more peaks on the waveform. This chromatogram waveform is converted into an image after the normalization of the signal intensity, i.e., the vertical axis in the graph, and is further divided into a predetermined number of partial waveforms along the horizontal axis, i.e., in the time-axis direction. The number of divisions is determined so that the width (or length in the time-axis direction) of each partial waveform will be smaller than the peak width. Accordingly, the number of divisions can be appropriately set depending on the minimum value of the expected peak width. It is also possible to handle the signal waveform as a one-dimensional array of data, instead of converting the waveform into an image to handle it as a two-dimensional array of data.

One chromatogram waveform consists of many partial waveforms. The data forming each partial waveform is related to property information which indicates the kind of region which the partial waveform corresponds to among specific kinds of regions. For example, a piece of property information representing a peak region is related to a partial waveform corresponding to a peak portion on a chromatogram waveform. Similarly, a piece of property information representing a peak-beginning region is related to a partial waveform including a peak-beginning point, while a piece of property information representing a non-peak region (baseline region) is related to a partial waveform which includes no peak portion. There are at least four kinds of regions: the peak region, peak-beginning region, peak-ending region and non-peak region. The peak region may be subdivided into two types depending on the state of the peak in the peak portion, i.e., a single-peak region with only one peak present (no other peaks overlapping) and an unseparated-peak region with a plurality of peaks overlapping each other. The unseparated-peak region can also be further subdivided, as will be described later. The partial waveform data forming each of the large number of chromatogram waveforms and the corresponding property information are related to each other and stored in the learning data storage section 30. The learning data may be previously divided into training data and verification data, or such a division may be omitted so that each piece of data can be appropriately used as training data or verification data when the learning is performed.

When a command to initiate the creation of the learning model is issued, the learning executer 31 prepares a learning model which has not been trained yet (Step S2). Various models with which semantic segmentation can be performed may be used as this learning model. Semantic segmentation is generally used for analyzing an image consisting of pixel data distributed in a two-dimensional form. In the present case, however, the technique is applied to an analysis of the waveform of a chromatogram consisting of a series of data arrayed in a one-dimensional form along the time axis. In the present embodiment, U-Net (see Non Patent Literature 2) is used as the learning model with which semantic segmentation can be performed, although other learning models may also be used, such as SeGNet or PSPNet.

Next, the learning executer 31 reads learning data (partial waveform data and property information) from the learning data storage section 30 (Step S3). The learning executer 31 performs machine learning using the read learning data and constructs a learning model for estimating the kind of region which a given partial waveform corresponds to (Step S4). No detailed description of the learning procedure will be hereinafter given. For example, a trained model can be constructed according to a procedure described in Patent Literature 1.

In the model storage section 32, the trained model created by the machine learning using a large number of sets of learning data is saved (Step S5). The trained model thus saved in the model storage section 32 is transmitted to and stored in the trained model storage section 212 in the LC system A through a data communication network, for example.

The trained model used in the present embodiment as well as the method for creating the trained model are mere examples. It should naturally be understood that the present invention is not limited to the descriptions of the present embodiment. That is to say, the present invention is generally applicable to a wide range of trained models which potentially have a problem explained in the present description. Another specific example of the trained model is a trained model which employs a common type of regression model. A common type of regression model is a technique for predicting a numerical value for a piece of input data. This model performs more limited processing than the previously described trained model which estimates a region, such as a peak region.

[Peak Detection Process for Analysis-Target Waveform]

Next, the process of detecting a peak on a chromatogram waveform acquired for a target sample, performed by the data analysis unit 2 in the LC system A, is described. FIG. 3 is a flowchart schematically showing the sequence of the peak detection process performed in the peak detection processor 21.

Initially, the waveform preprocessor 210 reads chromatogram waveform data to be analyzed from the data collector 20 (Step S11). After normalizing the signal intensity of the read data, the waveform preprocessor 210 converts the data into an image (or into a one-dimensional array) and divides the chromatogram waveform in the image into a predetermined number of partial waveforms in the horizontal-axis (time-axis) direction (Step S12). The number of divisions may be equal to the number of divisions in the learning data, although it may also be a different number as long as the width of the partial waveforms is smaller than the peak width.

Subsequently, the determiner 211 reads the trained model from the trained model storage section 212 and sequentially inputs partial waveforms into that model. For each input partial waveform, the trained model determines whether or not the partial waveform corresponds to each of the specific kinds of regions, including the peak region, peak-beginning region, peak-ending region and non-peak region. Specifically, in the present embodiment, the determiner 211 using the trained model calculates certainty information for each partial waveform and each kind of region, where the certainty information is a numerical value representing the probability that the partial waveform concerned corresponds to the kind of region concerned (Step S13). A higher value of the degree of certainty means a higher probability that the partial waveform corresponds to the kind of region concerned. Thus, the determiner 211 outputs all partial waveforms forming the input chromatogram waveform, with each partial waveform having certainty information in each of the seven kinds of regions, such as the peak region and the peak-beginning region.

The tentative region determiner 213 receives the output from the determiner 211 and determines, for each partial waveform, the kind of region corresponding to that partial waveform, assuming that a region which shows the highest degree of certainty should be the region corresponding to that partial waveform (Step S14). Thus, each of the partial waveforms forming the entire chromatogram waveform is classified into one of the previously mentioned kinds of regions.

Figure 4:
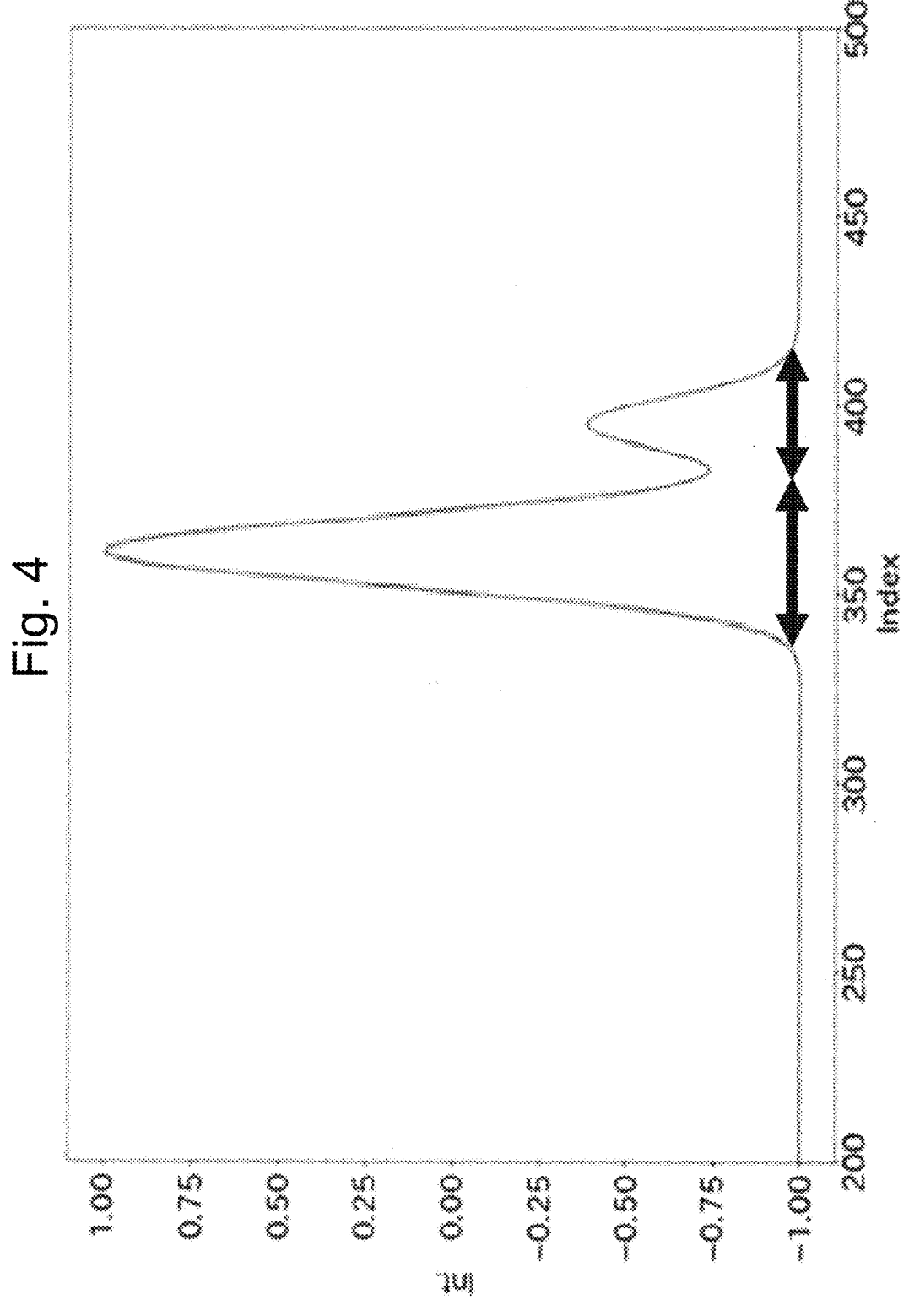
FIG. 4 is a diagram showing an example of a peak waveform on a chromatogram.
Figure 5:
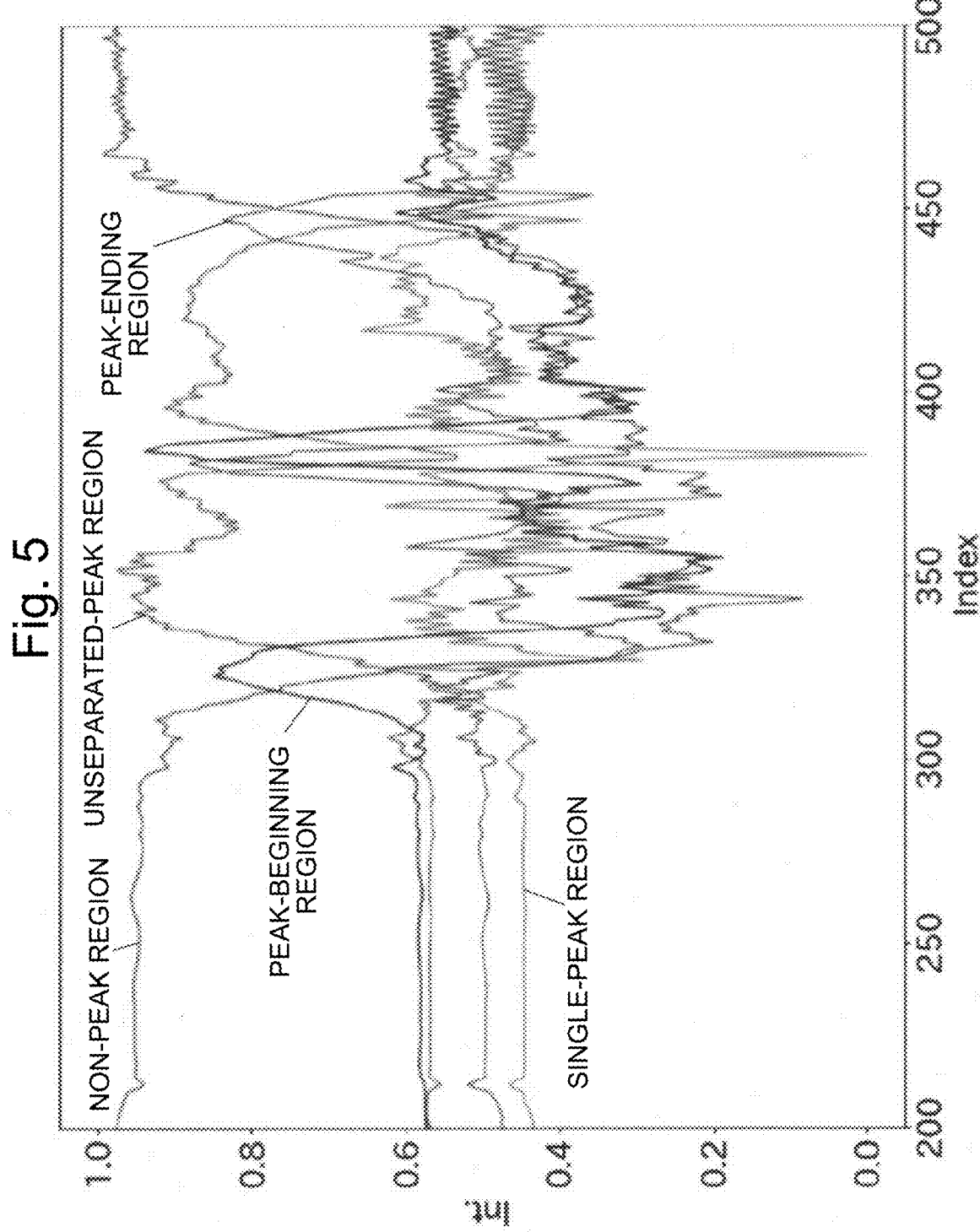
FIG. 5 is a diagram showing a result of the determination on the reliability of the regions, using a trained model for the peak waveform shown in FIG. 4.

A specific example is hereinafter given. Suppose that the analysis-target waveform is the chromatogram waveform shown in FIG. 4. As can be seen in FIG. 4, this chromatogram has two peaks which appear to overlap each other. The degree of certainty of each kind of region obtained in the determiner 211 for this chromatogram waveform is shown in FIG. 5. The vertical axis in FIG. 5 indicates the normalized degree of certainty. The higher (or the closer to one) this numerical value is, the more likely the kind of region is. It should be noted that the number of kinds of regions in this example is five since the peak region is subdivided into two kinds, i.e., the single-peak region and the unseparated-peak region.

Figure 6:
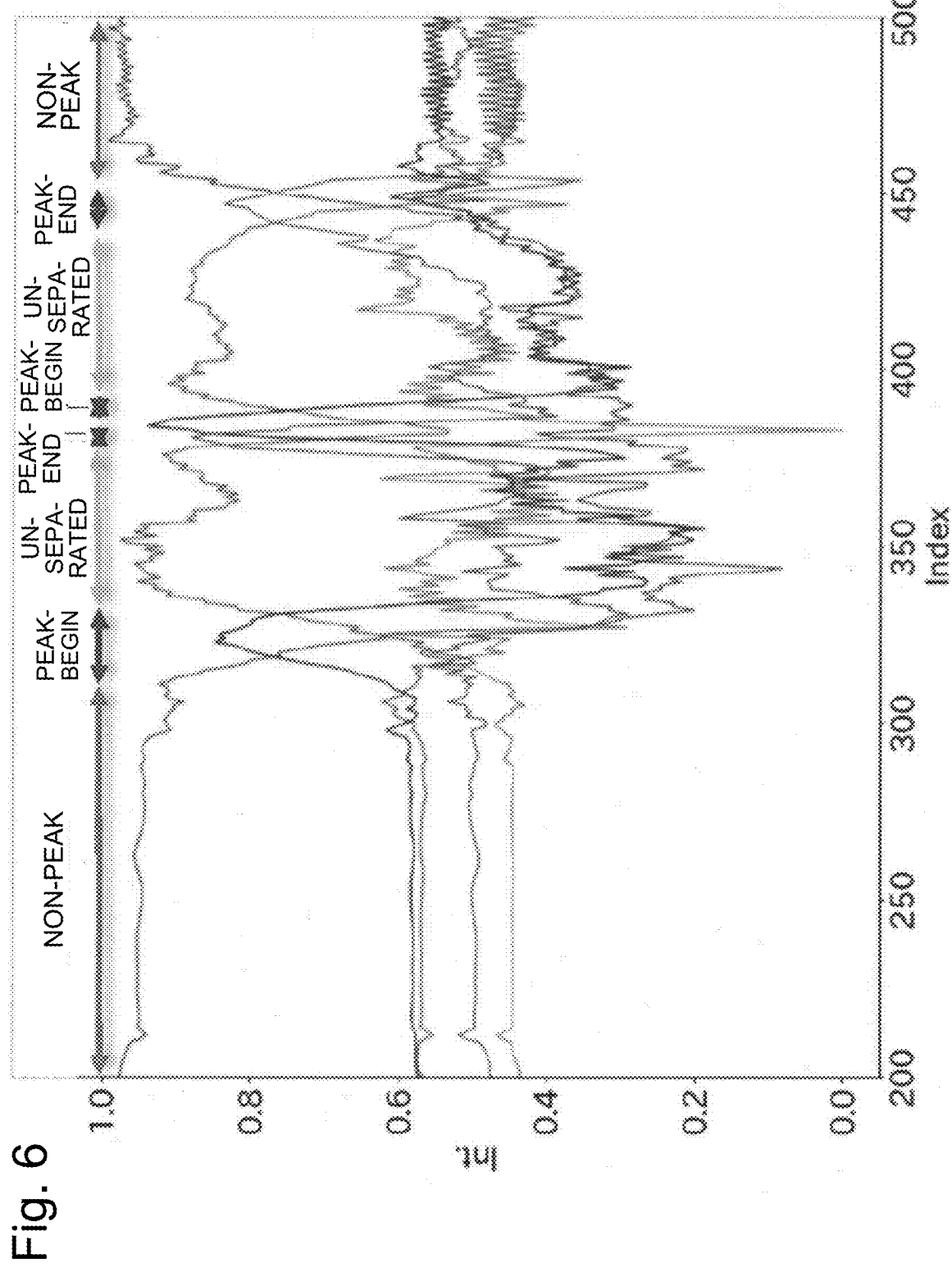
FIG. 6 is a diagram showing a region estimation result based on the determination result shown in FIG. 5 (when the estimation is appropriate).

FIG. 6 is a chart in which the regions determined by the tentative region determiner 213 are superposed on FIG. 5. In the present case, the region determination result in FIG. 6 as viewed in the direction of the passage of time (from left to right) is such that a non-peak region, peak-beginning region, unseparated-peak region, peak-ending region, peak-beginning region, unseparated-peak region, peak-ending region, and non-peak region sequentially appear. Thus, although the two peaks have their respective feet overlapping each other as shown in FIG. 4, the result in FIG. 6 shows that the two peaks are individually detected as unseparated-peak regions, with each unseparated-peak region having a peak-beginning region at its left end and a peak-ending region at its right end. In other words, each unseparated-peak region is sandwiched between a peak-beginning region and a peak-ending region. Accordingly, it is possible to conclude that the peak detection result is reasonable and appropriate at least from the viewpoint of the sequence of the regions.

Figure 7:
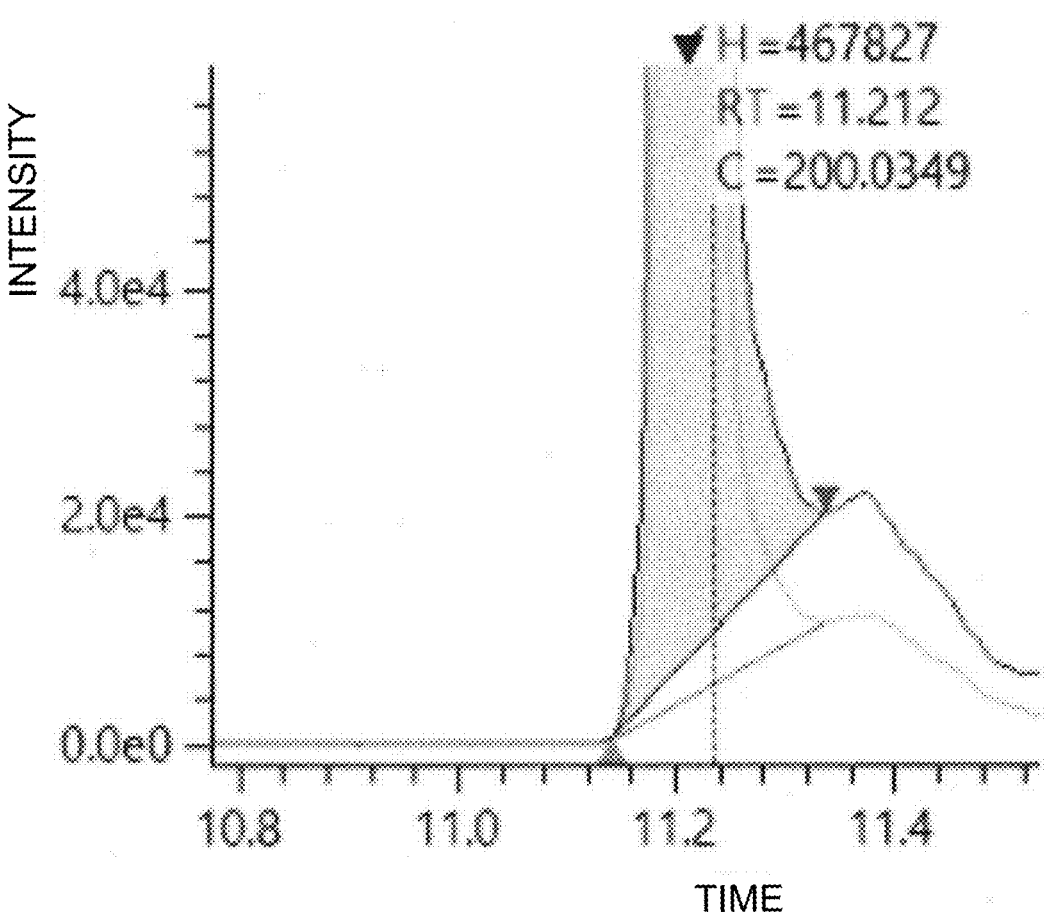
FIG. 7 is another example of a peak waveform on a chromatogram (when there is a tailing).
Figure 8:
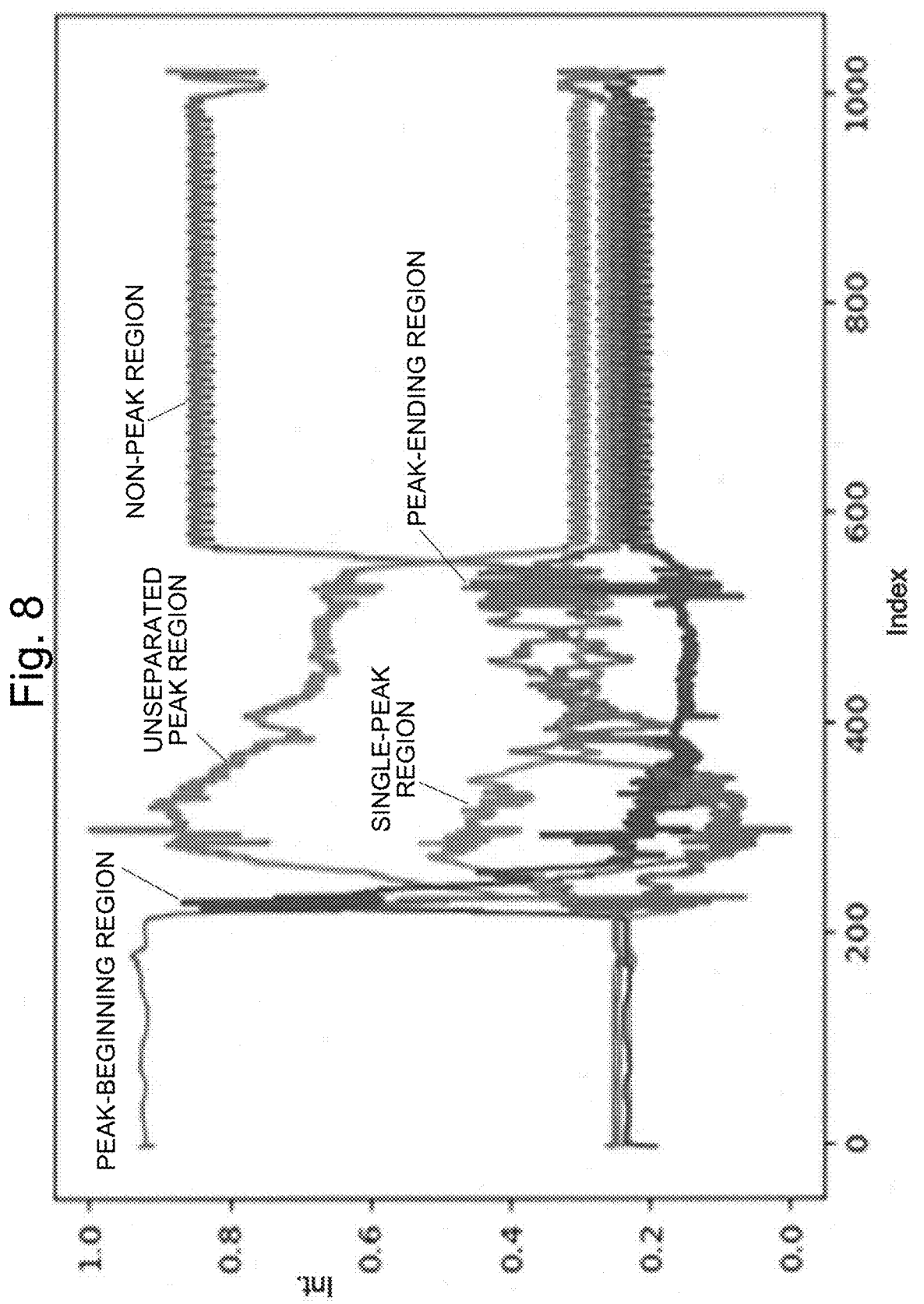
FIG. 8 is a diagram showing a result of the determination on the reliability of the regions, using a trained model for the peak waveform shown in FIG. 7 (when the estimation of the regions is inappropriate).

Next, consider the case where the chromatogram waveform as the analysis-target waveform is as shown in FIG. 7. This chromatogram waveform has a long tailing portion, with a noise peak (or another, extremely low peak) superposed on the tailing portion. The degree of certainty of each kind of region obtained in the determiner 211 for this chromatogram waveform is shown in FIG. 8. In the present case, a peak-beginning region is present at the left end of the unseparated-peak region, whereas no peak-ending region is present at the right end of the same unseparated-peak region; i.e., the unseparated-peak region borders on a non-peak region at this end. As a matter of technical common knowledge, any peak should have a beginning point and an ending point. From this point of view, the aforementioned detection result is unreasonable and inappropriate. A reason why the region determination using a trained model yields such a determination result is that the process of creating the trained model does not include training the model to learn the fact that any peak region should always have a peak-beginning region and a peak-ending region at both ends.

In the present embodiment, a processing for correcting an unreasonable determination result is performed as a post-processing that follows the previously described determination process employing machine learning. Specifically, one or more regulations concerning the sequence of the regions are previously registered in the irregular region detector 214. Upon receiving a region determination result based on partial waveforms from the tentative region determiner 213, the irregular region detector 214 recognizes the sequence of the regions along the time axis, i.e., from left to right in the chromatogram waveform, and determines whether or not the sequence conforms to the registered regulations. When a portion that does not conform to the regulations has been found, the irregular region detector 214 determines the position of that portion (Step S15).

In machine learning, statistical processing is performed from given learning data, without requiring explicit provision of the relationships or regulations between input and output. Therefore, a trained model created by machine learning can deal with a phenomenon that is not present in the regulations or an input that is irregular. However, there is also a slight possibility that the model produces a result that deviates from the regulations. The processing of Step S15 deals with this problem by determining whether or not an estimated result produced by the trained model is consistent with the regulations, and makes the result conform to the regulations as needed. This improves the output accuracy of the present system.

As for the regulations on the sequence of the regions, various conditions that are technically reasonable can be registered. Possible examples of the regulations are as follows:

<Regulation 1> One peak region should have a peak-beginning region at its left end and a peak-ending region at its right end.

<Regulation 2> When viewed from left to right, there should be only one kind of peak region between one peak-beginning region and one peak-ending region which appears next (e.g., there should not be a mixture of a single-peak region and an unseparated-peak region).

<Regulation 3> A peak region and a non-peak region should not border on each other.

Needless to say, those regulations are mere examples. Various regulations can be added as long as they are reasonable.

For example, in the example shown in FIG. 8, the irregular region detector 214 checks the sequence of the regions and recognizes that no peak-ending region is present at the right end of the unseparated-peak region, so that Regulation 1 is not satisfied. It also recognizes that an unseparated-peak region borders on a non-peak region, so that Regulation 3 is also not satisfied. Accordingly, the irregular region detector 214 detects the right end of the unseparated-peak region, i.e., the boundary between the unseparated-peak region and the non-peak region on the right side, as a portion that does not conform to the regulations. By comparison, in the example shown in FIG. 6, the irregular region detector 214 concludes that the sequence of the regions satisfies at least Regulations 1-3 and produces a result which indicates that there is no portion that does not conform to the regulations.

Upon receiving a result which indicates that a portion that does not conform to the regulations has been detected by the irregular region detector 214, the region corrector 215 corrects all or some of the regions determined in Step 14 according to a predetermined rule corresponding to each regulation (Step S16).

For example, when it has been determined that the regions do not conform to Regulation 1 due to the absence of one or both of the peak-beginning and peak-ending regions, the region corrector 215 changes the kind of region corresponding to the partial waveform located at the left and/or right end of the peak region to the peak-beginning and/or peak-ending region. When it has been determined that the regions do not conform to Regulation 2 due to the presence of different kinds of peak regions between one peak-beginning region and one peak-ending region which appears next, the region corrector 215 determines which of those different kinds of peak regions is broadest (or longest in the time direction) and replaces the narrower peak region with the broadest peak region. Consequently, the section between the peak-beginning region and the peak-ending region forming the pair is unified into one kind of peak region. When it has been determined that the regions do not conform to Regulation 3 due to a peak region bordering on a non-peak region, the region corrector 215 changes the kind of region corresponding to the partial waveform located at the boundary between the peak region and the non-peak region to the peak-beginning or peak-ending region.

After the kinds of regions have been thus corrected as needed, the display processor 23 shows the result of the peak detection by the peak detection processor 21 on the screen of the display unit 25 (Step S17). When the system is set to automatically perform a qualitative analysis based on the peak detection result, the qualitative-quantitative analyzer 22 calculates the retention time of the peak top, for example, for each detected peak and identifies the component corresponding to that peak based on its retention time. When the system is set to automatically perform a quantitative analysis based on the peak detection result, the qualitative-quantitative analyzer 22 determines the peak-area value or peak-height value for each detected peak and calculates the concentration (content) of the component corresponding to that peak by referring to a previously prepared calibration curve for the peak-area or peak-height value. The display processor 23 shows the result of the qualitative or quantitative analysis along with the peak detection result on the screen of the display unit 25.

As described to this point, when the peak information of a peak automatically detected by machine learning is unreasonable in view of common technical knowledge, the LC system according to the present embodiment can detect the inappropriate peak information and properly correct the information before presenting it to the user.

In the previous descriptions, the portion which has been detected by the irregular region detector 214 as a portion that does not conform to the regulations is automatically corrected. In some cases, it may be preferable to entirely discard the peak detection result rather than correcting it. Accordingly, when a portion has been identified by the irregular region detector 214 as not conforming to the regulations, the system may initially inform the user of the situation by displaying the detected portion on the display unit 25, rather than automatically correcting that portion. According to an instruction from the user who has checked the result, the system can correct some of the regions or entirely discard the peak detection result.

Next, some additional and preferable configurations will be described. Each of the configurations hereinafter described can be appropriately combined with those described in the previous embodiment. Two or more of those additional configurations may also be combined with each other as long as they do not perform incompatible processes.

In the previous embodiment, an overlap peak in which a plurality of peaks overlap each other as shown in FIG. 4 is handled as an unseparated-peak region. In the case of determining the concentration or content of a compound from the area or height of the peak, it is necessary to divide the overlap peak into the plurality of peaks. There are several commonly known methods for this division, and which dividing method is appropriate depends on the form of the overlap of the peaks (and other factors). Specific examples of the commonly used methods for dividing an overlap peak include: tailing processing, in which a peak is divided into two peaks in such a manner that the region from the beginning point to the ending point of the target peak is assumed to be one peak, with another peak superposed on that peak; complete separation, in which two peaks in the target peak are separated from each other by connecting the beginning point, local minimum point and ending point of the target peak by line segments in series; and vertical partitioning, in which two peaks in the target peak are separated from each other by a vertical line passing through the local minimum point in the target peak.

In the case of the tailing processing, the beginning and ending points of the two peaks are sequentially located in ascending order of retention time in such a manner that the beginning point of the first peak and that of the second peak initially appear, followed by the ending point of the first peak and that of the second peak. In the case of the complete separation or vertical partitioning, those points are sequentially located in ascending order of retention time in such a manner that the beginning point and the ending point of the first peak initially appear, followed by the beginning point and the ending point of the second peak. Accordingly, the setting of the regions may be altered so that the unseparated-peak region is subdivided into three kinds: the vertical partitioning peak region, complete separation peak region and tailing processing peak region. In this case, the trained model can be created by machine learning using a plurality of sets of partial waveforms, where each set of partial waveforms is prepared by dividing, along the time axis, reference waveforms each including an overlap peak separated into peaks by one of the three methods, i.e., the tailing processing, complete separation and vertical partitioning.

In the previous embodiment, the sequence of the regions determined based on the determination result by the determiner 211 is used for judging the unreasonableness or inappropriateness of a peak detection result. Other various factors may additionally be considered for the judgment.

For example, a piece of numerical information reflecting the shape or property of the peak within the range corresponding to the peak region can be used for altering some of the regulations for determining the sequence of the regions, or for altering the rules for correcting some of the regions. Examples of the values that can be used as the numerical information reflecting the shape or property of the peak include signal-to-noise ratio, degree of separation of the peak, symmetry factor, percentage of a missing portion of the peak, peak height and peak width.

For example, suppose that a region has been identified as a peak region. If the signal-to-noise ratio calculated from the signal intensity at the peak region and one at a non-peak region is not higher than a predetermined threshold (e.g., 10), it is likely that a noise component is incorrectly recognized as a peak, and the peak detection result itself is not sufficiently reliable. Therefore, if the signal-to-noise ratio at a portion identified as a peak region is not higher than a predetermined threshold, the peak region concerned, including the peak-beginning or peak-ending region at one end of that peak region, may be entirely replaced by a non-peak region.

Another example, the symmetry factor, is an index of the bilateral symmetry of a peak. A peak having a low degree of bilateral symmetry may possibly consist of a large peak with a lower peak superposed on its skirt. Accordingly, when the symmetry factor is higher than a predetermined threshold, the peak portion concerned may be entirely replaced by an unseparated-peak region even when the region corresponding to that peak portion has been identified as a single-peak region or even when the percentage of the unseparated-peak region is low. A similar processing may also be performed in the case where the peak width is too large.

As for the degree of separation, the Japanese Pharmacopoeia states that complete separation means that the resolution between two peaks is not less than 1.5. Accordingly, based on this degree of separation, a complete separation peak region can be corrected to an unseparated-peak region, or vice versa. When a partially missing peak is present at an end of a chromatogram, there will be no problem with the quantitative determination for that peak if the percentage of the missing portion is low, whereas that peak is inappropriate for the quantitative determination if the percentage of the missing portion is high. Accordingly, the kind of region may be changed so that a peak having a high percentage of missing portion will not be detected as a peak.

The gradient of the baseline may be calculated from a partial waveform identified as a non-peak region, and the calculated value may be used for altering some of the regulations for determining the sequence of the regions, or for altering the rules for correcting some of the regions. Specifically, when the gradient of the baseline is positive and changing from larger to smaller values with the passage of time, it is most likely that the baseline is convex upward. In this case, when an overlap peak on this baseline has been identified as a vertical partitioning peak region, the bottom portion of the trough in that overlap peak can be presumed to be in contact with the upward-convex baseline, so that the region can be changed to a complete separation peak region.

In the case where a numerical value reflecting the shape or property of the peak or a numerical value reflecting the form of the baseline is compared with a threshold to make a determination on the peak, it is preferable to allow the threshold to be set through the input unit 24. This allows the user to appropriately change the criteria for changing the regions, depending on the purpose of the analysis, kind of sample or other related factors.

Mass spectrometers normally allow for the observation of a plurality of kinds of ions which are produced from one component and have different $m/z$ values (those ions are called a "target ion" and a "qualifier ion"). Accordingly, a GC-MS or LC-MS can create an extracted ion chromatogram for a target ion as well as one or more extracted ion chromatograms for one or more qualifier ions for the same component. Those chromatograms should be similar in the shape of the waveform since they originate from the same component. Accordingly, it is possible to compare the region estimation result in the chromatogram of the target ion and the region estimation result in the chromatogram of a quantifier ion for the same component, and to alter the regulations for determining the sequence of the regions, or to alter the rules for modifying the regions, based on the result of the comparison.

For example, when the sequence of the regions determined in the peak detection for a chromatogram of a target ion does not conform to the regulations, the peak detection for a chromatogram of a qualifier ion of the same component can be referred to, and the latter result can be adopted if it conforms to the regulations.

It is also possible to compare a region estimation result in a signal waveform, such as a chromatogram or spectrum, obtained for an unknown sample containing a target component and a result obtained for an authentic preparation sample containing the same target component at a known concentration, or to additionally use a region estimation result in a signal waveform, such as a chromatogram or spectrum, obtained for a blank sample with no target component contained.

Compound information related to a target compound in a sample, which can be previously known, may additionally be used for the determination on the appropriateness of the regions. The "compound information" in the present context may include, for example, the concentration of the compound, as well as structural information (e.g., whether or not the compound has an isomer) or information concerning whether or not there is a derivative produced in a pretreatment or other related processes.

For example, suppose that it is previously known as compound information that the target compound has isomers. Although isomers have equal molecular weights, their peaks are often temporally separated from each other on the chromatogram due to their structural difference (or the like). Accordingly, for a plurality of peaks which are presumed to correspond to the target compound, it is possible to perform an appropriate correction of the regions, such as the replacement of a peak portion with an unseparated-peak region, even when that peak portion has been identified as a single-peak region.

By using additional information in the process of determining the appropriateness of the sequence of the regions determined by a trained model or correcting the regions in the previously described manner, the peak detection accuracy can be even further improved.

The previous embodiment and variations are mere examples and can be appropriately changed or modified without departing from the spirit of the present invention. Although the waveform-analyzing device for performing peak detection in the previous embodiment is included in the LC system A in which the measurement unit is also included, it may alternatively be configured as a waveform-analyzing device independent of the LC system A. In that case, the device can be configured to read and analyze chromatogram data previously acquired with the LC measurement unit 1.

Although the previously described embodiment was concerned with the case of processing a chromatogram waveform, it is evident that the present invention is applicable to the waveform analysis of a signal waveform acquired with various types of analyzing devices whose signal intensity can alter with a change in the value of a predetermined parameter, such as an electropherogram acquired with an electrophoresis apparatus, a mass spectrum (profile spectrum) acquired with a mass spectrometer, an optical spectrum acquired with an spectrophotometer, a fluorescence spectrum acquired with a fluorometer, or an X-ray intensity spectrum acquired with an X-ray analyzer.

VARIOUS MODES

A person skilled in the art can understand that the previously described illustrative embodiment is a specific example of the following modes of the present invention.

(Clause 1) One mode of the waveform-analyzing method according to the present invention is a waveform-analyzing method for analyzing a signal waveform which is a chromatogram or a spectrum, the method including:

a model creation step for creating a trained model for locating a peak portion in an input waveform, by machine learning using a plurality of sets of reference waveforms in each of which the position of the peak portion is known;

a region estimation step for dividing an analysis-target waveform into a plurality of partial waveforms, for determining whether or not each of the plurality of partial waveforms is a peak portion by using the trained model, and for estimating a plurality of different kinds of regions including a peak region and a non-peak region in the analysis-target waveform, based on the result of the determination; and a detection step for detecting an inappropriate region estimation result by determining whether or not the sequence of the regions estimated in the region estimation step along the horizontal axis of the analysis-target waveform conforms to a predetermined regulation.

(Clause 2) In the waveform-analyzing method according to Clause 1, the trained model for locating a peak portion in an input waveform may be created in the model creation step by machine learning using a plurality of sets of partial waveforms, where each set of partial waveforms is prepared by dividing a reference waveform in which the position of the peak portion is known.

(Clause 15) One mode of the waveform-analyzing device according to the present invention is a waveform-analyzing device configured to analyze a signal waveform which is a chromatogram or a spectrum, the device including:

a region estimator configured to divide an analysis-target waveform into a plurality of partial waveforms, to determine whether or not each of the plurality of partial waveforms of the analysis-target waveform is a peak portion, by using a trained model created by machine learning using a plurality of reference waveforms in each of which the position of the peak portion is known, and to estimate a plurality of different kinds of regions including a peak region and a non-peak region in the analysis-target waveform, based on the result of the determination; and a detector configured to detect an inappropriate region estimation result by determining whether or not the sequence of the regions estimated in the region estimator along the horizontal axis of the analysis-target waveform conforms to a predetermined regulation.

(Clause 16) In the waveform-analyzing device according to Clause 15, the trained model may be created by machine learning using a plurality of sets of partial waveforms, where each set of partial waveforms is prepared by dividing a reference waveform in which the position of the peak portion is known.

By the waveform-analyzing method according to Clauses 1 and 2 as well as the waveform-analyzing device according to Clauses 15 and 16, even when the peak detection has not been appropriately performed by a peak detection process which employs machine learning, the inappropriate peak portion can be automatically recognized by a waveform-processing operation performed after the peak detection process, and the inappropriate portion can be shown to the user or be automatically corrected without manual intervention. Thus, the peak detection can be automatized by using machine learning, while eliminating or decreasing an output of an unreasonable, inappropriate peak detection result that cannot be yielded by peak detection based on human judgment.

(Clause 3) The waveform-analyzing method according to Clause 1 may further include a correction step for correcting the region estimation result in the inappropriate portion detected in the detection step, according to a predetermined rule.

(Clause 17) The waveform-analyzing device according to Clause 15 may further include a corrector configured to correct the region estimation result in the inappropriate portion detected by the detector, according to a predetermined rule.

By the waveform-analyzing method according to Clause 3 and the waveform-analyzing device according to Clause 17, peak information related to a portion on a signal waveform at which the peak detection has not been appropriately performed by the peak detection process which employs machine learning can be corrected to appropriate information without relying on manual intervention. Therefore, the situation in which the incorrect peak information is provided to the user can be avoided. Furthermore, the accuracy of qualitative determination can be improved since the number of undetected peaks is decreased.

(Clause 4) The waveform-analyzing method according to Clause 1 may further include an informing step for informing a user of the region estimation result in the inappropriate portion detected in the detection step, in a visible form for the user.

(Clause 18) The waveform-analyzing device according to Clause 15 may further include an informing section configured to inform a user of the region estimation result in the inappropriate portion detected by the detector, in a visible form for the user.

In the waveform-analyzing method according to Clause 4 and the waveform-analyzing device according to Clause 18, even when the peak detection has not been appropriately performed by a peak detection process which employs machine learning, the user can assuredly understand the situation. This allows the user to rely on their own judgment or experience (or the like) and appropriately modify the incorrect peak information or delete unnecessary information, so that more accurate peak information can be obtained.

(Clause 5) In the waveform-analyzing method according to Clause 1:

the trained model may be created by machine learning using a plurality of reference waveforms in each of which the position of the beginning point and the position of the ending point of a peak are known;

the plurality of different kinds of regions may include a peak-beginning region and a peak-ending region in addition to the peak region and the non-peak region; and the predetermined regulation may require that one peak region has a peak-beginning region at one of the two ends of the peak region and a peak-ending region at the other end of the peak region.

(Clause 19) In the waveform-analyzing device according to Clause 15:

the trained model may be created by machine learning using a plurality of reference waveforms in each of which the position of the beginning point and the position of the ending point of a peak are known;

the plurality of different kinds of regions may include a peak-beginning region and a peak-ending region in addition to the peak region and the non-peak region; and the predetermined regulation may require that one peak region has a peak-beginning region at one of the two ends of the peak region and a peak-ending region at the other end of the peak region.

By the waveform-analyzing method according to Clause 5 and the waveform-analyzing device according to Clause 19, a peak whose beginning point and/or ending point has not been detected can be correctly located.

(Clause 6) In the waveform-analyzing method according to Clause 5, the detection step may include searching for a pair of a peak-beginning region and a peak-ending region along the horizontal axis of the analysis-target waveform in ascending order of the parameter value of the horizontal axis, and determining that the region estimation result is appropriate if one peak region is sandwiched between the detected pair of the peak-beginning region and the peak-ending region.

(Clause 20) In the waveform-analyzing device according to Clause 19, the detector may be configured to search for a pair of a peak-beginning region and a peak-ending region along the horizontal axis of the analysis-target waveform in ascending order of the parameter value of the horizontal axis, and to determine that the region estimation result is appropriate if one peak region is sandwiched between the detected pair of the peak-beginning region and the peak-ending region.

In the waveform-analyzing method according to Clause 6 and the waveform-analyzing device according to Clause 20, the "parameter of the horizontal axis" is time in a chromatogram or time-of-flight spectrum, m/z value in a mass spectrum, wavelength or wavenumber in a light intensity spectrum (e.g., optical spectrum), or wavelength or energy in an X-ray intensity spectrum. By the waveform-analyzing method according to Clause 6 and the waveform-analyzing device according to Clause 20, for example, it is possible to correctly locate a peak whose beginning point and ending point are both undetected, or a peak whose waveform shape is so special that it is difficult to make a stable determination on whether the peak corresponds to a single-peak region or unseparated-peak region.

(Clause 7) The waveform-analyzing method according to Clause 5 may further include a correction step for correcting one or both of the two ends of a peak region to a peak-beginning region and/or a peak-ending region if one or both of the peak-beginning region and the peak-ending region are found to be nonexistent at the ends of that peak region in the detection step.

(Clause 21) In the waveform-analyzing device according to Clause 19, the detector may further include a corrector configured to correct one or both of the two ends of a peak region to a peak-beginning region and/or a peak-ending region if one or both of the peak-beginning region and the peak-ending region are found to be nonexistent at the ends of that peak region.

By the waveform-analyzing method according to Clause 7 and the waveform-analyzing device according to Clause 21, even when there is a peak whose beginning point and/or ending point has not been detected by the peak detection which employs machine learning, the beginning point and/or ending point of that peak can be located and the accurate peak information can be provided.

(Clause 8) In the waveform-analyzing method according to Clause 5:

the peak region may include a single-peak region with a single peak and an unseparated-peak region with a plurality of peaks overlapping each other; and the detection step may include determining that the region estimation result is inappropriate if the two or more different kinds of peak regions border on each other along the horizontal axis of the analysis-target waveform.

(Clause 22) In the waveform-analyzing device according to Clause 19:

the peak region may include a single-peak region with a single peak and an unseparated-peak region with a plurality of peaks overlapping each other; and the detector may be configured to determine that the region estimation result is inappropriate if the two or more different kinds of peak regions border on each other along the horizontal axis of the analysis-target waveform.

By the waveform-analyzing method according to Clause 8 and the waveform-analyzing device according to Clause 22, for example, it is possible to correctly detect a peak whose beginning point and ending point are both undetected, or a peak whose waveform shape is so special that it is difficult to make a stable determination on whether the peak corresponds to a single-peak region or unseparated-peak region.

(Clause 9) The waveform-analyzing method according to Clause 5 may further include a correction step for unifying the two or more different kinds of peak regions into the kind of peak region having the largest length among those peak regions when it is determined that the region estimation result is inappropriate since the two or more different kinds of peak regions border on each other along the horizontal axis of the analysis-target waveform in the detection step.

(Clause 23) In the waveform-analyzing device according to Clause 19, the detector may further include a corrector configured to unify the two or more different kinds of peak regions into the kind of peak region having the largest length among those peak regions when it is determined that the region estimation result is inappropriate since the two or more different kinds of peak regions border on each other along the horizontal axis of the analysis-target waveform.

By the waveform-analyzing method according to Clause 9 and the waveform-analyzing device according to Clause 23, for example, even when there is a peak whose beginning point and ending point are both undetected, or a peak whose waveform shape is so special that it is difficult to make a stable determination on whether the peak corresponds to a single-peak region or unseparated-peak region, it is possible to locate the beginning point and/or ending point of that peak, or determine whether the peak corresponds to a single-peak region or unseparated-peak region, so that accurate peak information can be provided.

(Clause 10) In the waveform-analyzing method according to Clause 1, the detection step may include calculating one or more of the following values: a signal-to-noise ratio, a degree of separation, a symmetry factor, a percentage of a missing portion of the peak, a peak height and a peak width in the peak region, as well as a gradient of the baseline in the non-peak region, and additionally using the calculated result for the determination on the appropriateness of the regions.

By the waveform-analyzing method according to Clause 10, it is possible to more accurately detect peaks and obtain peak information by referring to numerical information determined from the shape and property of the peak, form of the baseline and other features, in addition to the information of the sequence of the regions obtained from the determination using machine learning.

(Clause 11) In the waveform-analyzing method according to Clause 10, a threshold which is referred to when the calculated result is used for the determination may be settable by a user.

By the waveform-analyzing method according to Clause 11, a more appropriate peak detection can be performed depending on the kind of sample, purpose of the analysis, state of the device, analysis conditions and other factors, so that highly accurate peak information can be provided.

(Clause 12) In the waveform-analyzing method according to Clause 1, the signal waveform may be a chromatogram acquired by chromatograph mass spectrometry, and the detection step may include comparing a region estimation result in a chromatogram of a target ion and a region estimation result in a chromatogram of a qualifier ion of the same component, and additionally using the result of the comparison for the determination on the appropriateness of the regions.

A target ion and a qualifier ion originating from the same component should appear as peaks having approximately similar shapes in their respective extracted ion chromatograms. Accordingly, for example, when a peak cannot be appropriately detected for some reasons in one of the two chromatograms, the peak detection result in the other chromatogram can be used to obtain highly accurate peak information.

(Clause 13) In the waveform-analyzing method according to Clause 1, the detection step may include comparing region estimation results in signal waveforms respectively acquired from at least two of the following kinds of samples: an unknown sample containing a target component, an authentic preparation sample containing the target component at a known concentration and a blank sample with no target component contained, and additionally using the result of the comparison for the determination on the appropriateness of the regions.

When two chromatograms are respectively acquired for an unknown sample and an authentic preparation sample containing the same target component, a peak corresponding to the target component should appear in both chromatograms. Those peaks should be similar in shape, provided that the overlap of other peaks and the influence of noise components are ignored. Accordingly, for example, when a peak cannot be appropriately detected for some reasons in one of the two chromatograms, the peak detection result in the other chromatogram can be used to obtain highly accurate peak information.

On the other hand, in a chromatogram acquired for a blank sample, a baseline which is approximately identical to the baseline in a chromatogram acquired for an unknown sample or authentic preparation sample should appear. Accordingly, for example, even when the baseline is significantly inclined, highly accurate peak information can be obtained by using a peak detection result in a chromatogram acquired for a blank sample when making a determination on a peak detection result based on a chromatogram acquired for an unknown or authentic preparation sample.

(Clause 14) In the waveform-analyzing method according to Clause 1, compound information related to a target compound may be additionally used for the determination on the appropriateness of the regions in the detection step.

The "compound information" in the present context may include information concerning the compound itself contained in the sample, such as its concentration value, as well as other kinds of information, such as information concerning an isomer of the compound or information concerning a derivative resulting from a pretreatment or the like.

By the waveform-analyzing method according to Clause 14, a more appropriate peak detection can be performed by using compound information, so that highly accurate peak information can be provided.

(Clause 24) One mode of the analyzing system according to the present invention is a chromatograph system, a mass spectrometer or a spectrophotometer and includes the waveform-analyzing device according to one of Clauses 15-23 as a data analyzer.

The analyzing system according to Clause 24 can achieve a high level of performance in qualitative and quantitative determination by using highly accurate peak information.

REFERENCE SIGNS LIST

A . . . LC System
1 . . . LC Measurement Unit
2 . . . Data Analysis Unit
20 . . . Data Collector
21 . . . Peak Detection Processor
210 . . . Waveform Preprocessor
211 . . . Determiner
212 . . . Model Storage Section
213 . . . Tentative Region Determiner
214 . . . Irregular Region Detector
215 . . . Region Corrector
22 . . . Qualitative-Quantitative Analyzer
23 . . . Display Processor
24 . . . Input Unit
25 . . . Display Unit
3 . . . Model Creation Unit
30 . . . Learning Data Storage Section
31 . . . Learning Executer
32 . . . Model Storage Section

The invention claimed is:

1. A waveform-analyzing method for analyzing a signal waveform which is a chromatogram or a spectrum with intensity on a vertical axis and time, wavelength, or mass to charge ratio on a horizontal axis, comprising:
   a model creation step for creating a trained model for locating a peak portion on the horizontal axis in an input waveform, by machine learning using a plurality of sets of reference waveforms in each of which a position of the peak portion is known;
   a region estimation step for dividing an analysis-target waveform into a plurality of partial waveforms on the horizontal axis, for determining whether or not each of the plurality of partial waveforms is a peak portion by using the trained model, and for estimating a plurality of different kinds of regions including a peak region and a non-peak region in the analysis-target waveform, based on a result of the determination; and
   a detection step for detecting an incorrect region estimation result by determining whether or not a sequence of the regions estimated in the region estimation step along the horizontal axis of the analysis-target waveform conforms to a predetermined regulation.

2. The waveform-analyzing method according to claim 1, wherein the trained model for locating a peak portion in an input waveform is created in the model creation step by machine learning using a plurality of sets of partial waveforms, where each set of partial waveforms is prepared by dividing a reference waveform in which the position of the peak portion is known.

3. The waveform-analyzing method according to claim 1, further comprising a correction step for correcting the region estimation result in the incorrect portion detected in the detection step, according to a predetermined rule.

4. The waveform-analyzing method according to claim 1, further comprising an informing step for informing a user of the region estimation result in the incorrect portion detected in the detection step, in a visible form for the user.

5. The waveform-analyzing method according to claim 1, wherein:
   the trained model is created by machine learning using a plurality of reference waveforms in each of which a position of a beginning point and a position of an ending point of a peak are known;
   the plurality of different kinds of regions include a peak-beginning region and a peak-ending region in addition to the peak region and the non-peak region; and
   the predetermined regulation requires that one peak region has a peak-beginning region at one of two ends of the peak region and a peak-ending region at another end of the peak region.

6. The waveform-analyzing method according to claim 5, wherein the detection step includes searching for a pair of a peak-beginning region and a peak-ending region along the horizontal axis of the analysis-target waveform in ascending order of a parameter value of the horizontal axis, and determining that the region estimation result is correct if one peak region is sandwiched between the detected pair of the peak-beginning region and the peak-ending region.

7. The waveform-analyzing method according to claim 5, further comprising a correction step for correcting one or both of two ends of a peak region to a peak-beginning region and/or a peak-ending region if one or both of the peak-beginning region and the peak-ending region are found to be nonexistent at the ends of that peak region in the detection step.

8. The waveform-analyzing method according to claim 5, wherein:
   the peak region includes a single-peak region with a single peak and an unseparated-peak region with a plurality of peaks overlapping each other; and
   the detection step includes determining that the region estimation result is incorrect if the two or more different kinds of peak regions border on each other along the horizontal axis of the analysis-target waveform.

9. The waveform-analyzing method according to claim 5, further comprising a correction step for unifying the two or more different kinds of peak regions into a kind of peak region having a largest length among those peak regions when it is determined that the region estimation result is incorrect since the two or more different kinds of peak regions border on each other along the horizontal axis of the analysis-target waveform in the detection step.

10. The waveform-analyzing method according to claim 1, wherein the detection step includes calculating one or more of following values: a signal-to-noise ratio, a degree of separation, a symmetry factor, a percentage of a missing portion of the peak, a peak height and a peak width in the peak region, as well as a gradient of a baseline in the non-peak region, and additionally using the calculated result for the determination on correctness of the regions.

11. The waveform-analyzing method according to claim 10, wherein a threshold which is referred to when the calculated result is used for the determination is settable by a user.

12. The waveform-analyzing method according to claim 1, wherein:
   the signal waveform is a chromatogram acquired by chromatograph mass spectrometry; and
   the detection step includes comparing a region estimation result in a chromatogram of a target ion and a region estimation result in a chromatogram of a qualifier ion of the same component, and additionally using a result of the comparison for the determination on correctness of the regions.

13. The waveform-analyzing method according to claim 1, wherein:
   the detection step includes comparing region estimation results in signal waveforms respectively acquired from at least two of following kinds of samples: an unknown sample containing a target component, an authentic preparation sample containing the target component at a known concentration and a blank sample with no target component contained, and additionally using a result of the comparison for the determination on correctness of the regions.

14. The waveform-analyzing method according to claim 1, wherein compound information related to a target compound is additionally used for the determination on correctness of the regions in the detection step.

15. A waveform-analyzing device configured to analyze a signal waveform which is a chromatogram or a spectrum with intensity on a vertical axis and time, wavelength, or mass to charge ratio on a horizontal axis, comprising:

a region estimator configured to divide an analysis-target waveform into a plurality of partial waveforms on the horizontal axis, to determine whether or not each of the plurality of partial waveforms of the analysis-target waveform is a peak portion, by using a trained model created by machine learning using a plurality of reference waveforms in each of which a position of the peak portion is known, and to estimate a plurality of different kinds of regions including a peak region and a non-peak region in the analysis-target waveform, based on a result of the determination; and a detector configured to detect an incorrect region estimation result by determining whether or not a sequence of the regions estimated in the region estimator along the horizontal axis of the analysis-target waveform conforms to a predetermined regulation.

16. The waveform-analyzing device according to claim 15, wherein the trained model is created by machine learning using a plurality of sets of partial waveforms, where each set of partial waveforms is prepared by dividing a reference waveform in which the position of the peak portion is known on the horizontal axis.

17. The waveform-analyzing device according to claim 15, further comprising a corrector configured to correct the region estimation result in the incorrect portion detected by the detector, according to a predetermined rule.

18. The waveform-analyzing device according to claim 15, further comprising an informing section configured to inform a user of the region estimation result in the incorrect portion detected by the detector, in a visible form for the user.

19. The waveform-analyzing device according to claim 15, wherein:

the trained model is created by machine learning using a plurality of reference waveforms in each of which a position of a beginning point and a position of an ending point of a peak are known;

the plurality of different kinds of regions include a peak-beginning region and a peak-ending region in addition to the peak region and the non-peak region; and the predetermined regulation requires that one peak region has a peak-beginning region at one of two ends of the peak region and a peak-ending region at another end of the peak region.

20. The waveform-analyzing device according to claim 19, wherein the detector is configured to search for a pair of a peak-beginning region and a peak-ending region along the horizontal axis of the analysis-target waveform in ascending order of a parameter value of the horizontal axis, and to determine that the region estimation result is correct if one peak region is sandwiched between the detected pair of the peak-beginning region and the peak-ending region.

21. The waveform-analyzing device according to claim 19, wherein the detector further includes a corrector configured to correct one or both of the two ends of a peak region to a peak-beginning region and/or a peak-ending region if one or both of the peak-beginning region and the peak-ending region are found to be nonexistent at the ends of that peak region.

22. The waveform-analyzing device according to claim 19, wherein:

the peak region includes a single-peak region with a single peak and an unseparated-peak region with a plurality of peaks overlapping each other; and the detector is configured to determine that the region estimation result is incorrect if the two or more different kinds of peak regions border on each other along the horizontal axis of the analysis-target waveform.

23. The waveform-analyzing device according to claim 19, wherein the detector further includes a corrector configured to unify the two or more different kinds of peak regions into a kind of peak region having a largest length among those peak regions when it is determined that the region estimation result is incorrect since the two or more different kinds of peak regions border on each other along the horizontal axis of the analysis-target waveform.

24. An analyzing system which is a chromatograph system, a mass spectrometer or a spectrophotometer, comprising the waveform-analyzing device according claim 15 as a data analyzer.

* * * * *